3,278,543
BENZOTHIAZOLE COMPOUNDS
Werner Victor Cohen, Newark, Del., assignor to E. I. du Pont de Nemours and Company, Wilmington, Del., a corporation of Delaware
No Drawing. Filed July 1, 1965, Ser. No. 468,988
2 Claims. (Cl. 260—304)

This case is a continuation-in-part application of Serial No. 218,127, filed August 20, 1962, and now abandoned.

The present invention is directed to new water-soluble N-aryl cyanoacetamides that are useful in the manufacture of different types of methine dyes depending upon the choice of compound with which they are reacted. When reacted with selected aromatic aldehydes, the novel compounds afford useful yellow methine dyes having the

—CH=C< linkage. When reacted with aryl amines and oxidizing agents, or with aryl nitroso compounds, the novel amides afford useful magenta azomethine dyes having the —N=CH— linkage. The resulting dyes are characterized by exceptional strength and significant substantivity when applied to cellulosic fibers, particularly to paper pulp or to paper.

The novel cyanoacetamides, themselves, are substantive to cellulosic fibers on which they are useful either as whitening agents or as intermediates for the production of dyes by the processes hereinafter described. The novel intermediates of this invention possess significant and desirable fluorescent properties.

It is therefore an object of the present invention to provide valuable dye intermediates having the versatility mentioned heretofore. A further object is to provide significantly substantive, strong and bright dyes for paper. By substantive intermediates and dyes we mean those of the direct dye type that may be applied to paper pulp, or to cotton fiber, for example, without the use of rosin size and alum in the case of paper pulp.

These and other objects will be apparent from the following description and claims.

More specifically, the present invention is directed to compounds which have the formula

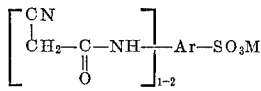

wherein the arylsulfonic acid radical Ar—$SO_3$M is a member of the group consisting of (a) 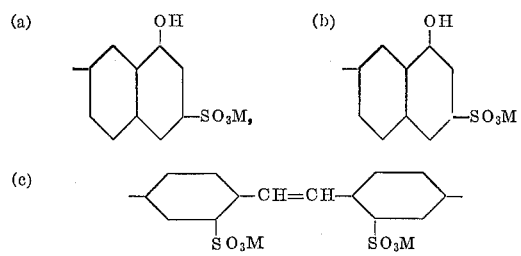

(b)

(c)

and (d) 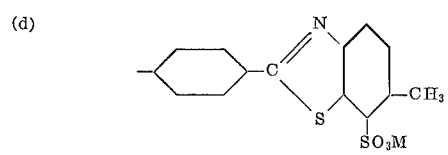

M is as hereafter defined.

The novel N-aryl cyanoacetamides of the present invention are prepared by heating an alkyl ester of cyanoacetic acid with the salt of an aminoarylsulfonic acid at a temperature of about 150° to 175° C. in a solvent such as N,N-dimethylacetamide, optionally in the presence of an alkaline compound such as sodium carbonate or an alkali metal alcoholate such as sodium methylate or in the presence of both of these.

The following examples are representative and illustrate the present invention:

Example 1

To an agitated suspension of 37 parts of 4,4'-diamino-2,2'-stilbenedisulfonic acid in 124 parts of N,N-dimethylacetamide are added 9.7 parts of sodium methylate and 1.1 parts of sodium carbonate followed by 65 parts of water. A homogeneous solution results upon addition of the water. The solution is heated to distill off about 70 parts of water and methanol, providing a suspension of the disodium salt of the organic disulfonic acid in anhydrous form. To the cooled supension are added 24.9 parts of ethyl cyanoacetate. The temperature of the reaction mass is raised to 160° C., and soon ethanol begins to distill off through fractionating equipment. The reaction is complete when distillation of ethanol ceases and a small amount of dimethylacetamide distills over (about 1 to 2 hours). Upon cooling the reaction mass, some of the product, 4,4'-bis(cyanoacetamido)-2,2'-stilbenedisulfonic acid, disodium salt, settles out. This product is filtered off, washed with 35 parts of ether, and dried. Addition of acetone to the original filtrate yields additional product of good quality.

The stilbene derivative thus obtained is substantive to cellulosic fibers on which it is useful as a whitening agent and as an intermediate for methine dyes.

Example 2

51 parts of the sodium salt of 6-amino-1-naphthol-3-sulfonic acid (J acid) are heated in 95 parts of N,N-dimethylacetamide to distill off any residual water that may be present. 24 parts of ethyl cyanoacetate are added and the reaction mass is heated to effect gentle boiling over a period of 2.5 hours. Ethanol is collected from the reaction mass by means of a fractionating column. At the end of the reaction period a small amount of the solvent distills off. The mass is then cooled and sufficient ether is added to effect phase separation. The dark lower layer is separated and dissolved in 150 parts of ethanol. This solution is treated with sufficient ether to effect phase separation again. The lower phase is separated and allowed to stand. After about 0.5 hour crystals form in the separated phase, and stirring leads to rapid crystallization of the entire mass. The 6-(cyanoacetamido)-1-naphthol-3-sulfonic acid, sodium salt thus obtained in an intermediate for strong, substantive, yellow methine dyes.

Example 3

A mixture of 68.4 parts of 2-(p-aminophenyl)-6-methyl-7-benzothiazolesulfonic acid, sodium salt (sulfo dehydrothio-p-toluidine) and 141.5 parts of N,N-dimethylacetamide is heated to remove residual water by distillation. 24.9 parts of ethyl cyanoacetate are added to the mixture which is then agitated at 161° to 171° C. while ethanol is fractionally distilled from the reaction mass. After heating in this manner for amout 2 hours the mass is cooled to room temperature. The precipitated reaction product is filtered off, washed with 70 parts of N,N-dimethylacetamide, and dried. An excellent yield of 2 - [p - (cyanoacetamido) - phenyl] - 6 - methyl - 7- benzothiazolesulfonic acid, sodium salt is obtained. It has the structure:

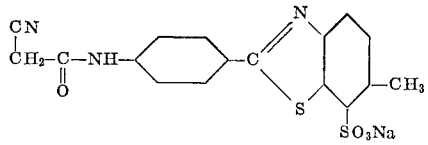

*Example 4*

65 parts of ethyl cyanoacetate are added to a stirred suspension of 110 parts of 7-amino-1-naphthol-3-sulfonic acid, sodium salt (gamma acid) in 1000 parts of N,N-dimethylacetamide. The mixture is heated so that a temperature of 172° C. is reached in a period of 2 hours. During this period, distillate (chiefly ethanol) is removed from the reaction mass through a fractionating column. The mass is cooled and then added to a 10-fold volume of isopropyl alcohol in which the reaction product precipitates as a tan granular material. The precipitate is filtered off, washed with isopropyl alcohol, and dried. An excellent yield of 7-(cyanoacetamido)-1-naphthol-3-sulfonic acid, sodium salt is obtained. It has the structure:

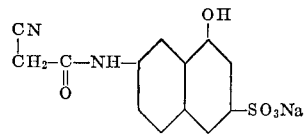

*Example 5*

Use of novel N-aryl cyanoacetamides in surface dyeing of papers:

A strip of paper is dipped into a 1% solution of 6-(cyanoacetamido)-1-naphthol-3-sulfonic acid, sodium salt (the intermediate prepared in Example 2). A rod, wetted by dipping into a 1% solution of p-dimethylaminobenzaldehyde in a 1:1 water-alcohol solvent containing a drop of piperidine, is drawn across the moist strip of paper. The paper is placed over a glass tube heated internally with steam. A yellow color develops where the rod was drawn across the paper.

This general method is useful for the surface dyeing of paper by first applying a substantive intermediate of the present invention to the paper pulp at the wet end of the paper making machine, followed by forming the paper sheet, contacting the latter with a solution of reactive color former, such as a substituted p-aminobenzaldehyde, and heating to dry the paper and develop the dye.

*Example 6*

Application of novel N-aryl cyanoacetamides to paper pulp:

One part of 2-[p-(cyanoacetamido)-phenyl]-6-methyl-7-benzothiazolesulfonic acid, sodium salt (prepared as in Example 3) is dissolved in 1670 parts of water, and the solution is added to a suspension of 100 parts of pure cellulose pulp (defibered bleached sulfite variety) in 3330 parts of water. The entire mass is agitated and beaten for 20 minutes then diluted with 20,000 parts of water, after which the pulp is separated on a wire screen. Water is then pressed out and sucked from the paper pulp, and the resulting sheet is dried to form a sheet of paper. The paper sheet retains 98% of the cyanoacetamido compound employed.

Two methods were used to measure the substantivity of the cyanoacetamido compound for the cellulosic fibers; (1) Nitrogen analysis of the dried paper to determine the amount of cyanoacetamido compound present, and (2) Spectral analyses of the "white water" (water remaining after removal of paper pulp) and of an identical solution except that it is not used in contact with pulp and, therefore, contains the original amount of cyanoacetamido compound. When the "white water" shows a substantial or complete loss of the characteristic ultra violet spectrum of the cyanoacetamido compound, the latter has been retained on the pulp. When the ultra violet spectra of the "white water" and the cyanoacetamido control solution are identical, this means that no cyanoacetamido compound has been retained by the pulp.

Based on nitrogen analyses and spectral data, as described, the substantivities of the four cyanoacetamido compounds of the present invention are shown by the following table which gives percent amounts (by weight) of these compounds retained in the paper pulp:

| Cyanoacetamido compounds as prepared in the examples: | Percent retained |
|---|---|
| Compound of Example 1 | 90 |
| Compound of Example 2 | 95 |
| Compound of Example 3 | 98 |
| Compound of Example 4 | 92 |

All N-aryl cyanoacetamides prepared from ethyl cyanoacetate and the following aminoaryl-sulfonic, or carboxylic acids, when tested as described above, show no retention whatsoever on the paper pulp: sulfanilic or metanilic acid, sodium salt; p-aminobenzoic acid; 2-amino-1-phenol-4-sulfonic acid, sodium salt; 6-amino-2-naphthalenesulfonic acid, sodium salt; 7-amino-1,3-naphthalenedisulfonic acid, disodium salt; and, dehydrothio-p-toluidinedisulfonic acid, disodium salt.

It is to be understood that, although the ethyl esters are used in the preceding representative examples, other short chain alkyl esters may be employed in these examples to give substantially the same results; such additional operative esters include the methyl, propyl, isopropyl and butyl cyanoacetates.

Furthermore, the aminoarylsulfonic acids which are part of my invention and form substantive amides when reacted with the hereindescribed cyanoacetates are identified in the representative examples and by an arylsulfonic acid radical in the introductory portion of the present specification.

The selection of the amines is critical. For instance, many closely related amines are inoperable in the present invention for at least two reasons; (a) their cyanoacetyl derivatives are not substantive, per se, on cellulosic fibers and (b) the methine dyes prepared by reacting the latter with substituted p-aminobenzaldehydes are, likewise, not substantive. The following list is typical of the aminoarylsulfonic or carboxylic acids which are inoperable in this sense, either in the form of their free acids or their alkali metal or ammonium salts: sulfanilic acid, p-aminobenzoic acid, 6-amino-2-naphthalenesulfonic acid, 7-amino-1,3-naphthalenedisulfonic acid, mixture of the 6-amino-1 and 2-naphthalenesulfonic acid, 2-amino-1-phenol-4-sulfonic acid and dehydrothio-p-toluidinedisulfonic acid.

M in the compounds of this invention is hydrogen, an alkali metal, an alkaline earth metal or the ammonium radical.

Since aminoarylsulfonic acids are reacted in alkaline medium with the alkyl cyanoacetates, the amide formation takes place between the ester and an alkali, or alkaline earth salt of the sulfonic acid. The alkali (or alkaline earth) salt form of the aminoarylsulfonic acids is the reactive species for the present reaction. Thus, the salt form of the cyanoacetamido compounds is obtained directly in the synthesis. By starting with the free acid, $SO_3H$, form of the aminoarylsulfonic acid used to prepare the amide, one is able to determine the particular alkali, or alkaline earth, cation in the salt of the amide-sulfonic acid end product by selection of the alkali or alkaline earth compound employed in the alkaline reaction medium. For this purpose, an alkali or alkaline earth base and/or an alkali alcoholate such as the following is suitable: the hydroxide, carbonates or bicarbonates of lithium, sodium or potassium; the hydroxides or carbonates of calcium, magnesium or barium; sodium, lithium, or potassium methylate, ethylate and the like.

One obtains the cyanoacetamide-arylsulfonic acids by agitating their alkali or alkaline earth metal salts in aqueous mineral acid such as hydrochloric or sulfonic acid. The free acids thus obtained are filtered from their cooled, concentrated solutions, and dried.

The ammonium salts of the cyanoacetamidoarylsulfonic acids are obtained by agitating the free acids with aqueous ammonium hydroxide, and drying.

The alkaline earth salts of the novel intermediates are also prepared by agitating aqueous solutions of the cyanoacetamido-arylsulfonic acids, or their alkali metal or ammonium salts, with alkaline earth compounds selected from the group comprising the water soluble chlorides, nitrates, hydroxides or sulfates of magnesium, calcium or barium. The resulting amides are filtered off, washed with water, and dried.

Other operable solvents of the amide type which may be utilized in the practice of the present invention include: N,N-diethylacetamide and N,N-dimethylformamide, these solvents may be substituted in the preceding examples to give essentially the same results.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

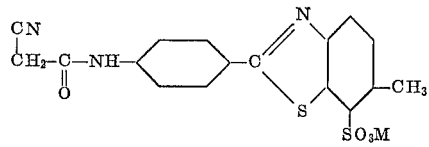

wherein M is selected from the group consisting of hydrogen, an alkali metal, an alkaline earth metal and the ammonium radical.

2. The compound

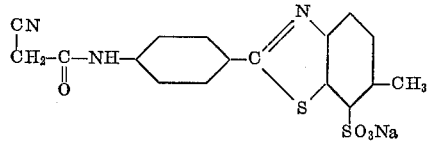

No references cited.

ALEX MAZEL, *Primary Examiner.*

ALTON D. ROLLINS, *Assistant Examiner.*